United States Patent [19]

Sharbaugh

[11] Patent Number: 4,613,478
[45] Date of Patent: Sep. 23, 1986

[54] PLENUM SEPARATOR SYSTEM FOR POOL-TYPE NUCLEAR REACTORS

[75] Inventor: John E. Sharbaugh, Bullskin Township, Westmoreland County, Pa.

[73] Assignee: Westinghouse Electric Corp., Pittsburgh, Pa.

[21] Appl. No.: 569,930

[22] Filed: Jan. 11, 1984

Related U.S. Application Data

[63] Continuation of Ser. No. 192,145, Sep. 29, 1980, abandoned, which is a continuation of Ser. No. 938,628, Aug. 31, 1978, abandoned.

[51] Int. Cl.⁴ .............................. G21C 11/08
[52] U.S. Cl. .............................. 376/290; 376/287; 376/399; 376/404
[58] Field of Search .............. 376/290, 287, 402–405, 376/294, 399

[56] References Cited

U.S. PATENT DOCUMENTS

| | | | |
|---|---|---|---|
| 3,518,163 | 6/1970 | DeBoisblanc | 376/290 |
| 3,962,032 | 6/1976 | Berniolles et al. | |
| 4,022,656 | 5/1977 | Durston et al. | 176/65 |
| 4,032,399 | 6/1977 | Defauchy et al. | 176/40 |
| 4,055,465 | 10/1977 | Lemercier | 176/65 |
| 4,056,438 | 11/1977 | Gama et al. | 176/38 |
| 4,087,325 | 5/1978 | Chevallier et al. | 176/38 |
| 4,101,377 | 7/1978 | Berniolles et al. | |
| 4,127,444 | 11/1978 | Gama et al. | 176/38 |
| 4,154,651 | 5/1979 | Kenworthy et al. | 176/38 |
| 4,156,629 | 5/1979 | Andreani et al. | 176/65 |
| 4,219,385 | 8/1980 | Guidez et al. | 376/404 |
| 4,249,995 | 2/1981 | Jogand | 376/290 |

FOREIGN PATENT DOCUMENTS 2036828 12/1970 France .................................. 176/62

OTHER PUBLICATIONS

Nuclear Eng. Int. 6/78, "Construction of the World's First Full-Scale Fast Breeder Reactor", cited as pp. 1–18.

Primary Examiner—Harvey E. Behrend
Attorney, Agent, or Firm—W. D. Palmer

[57] ABSTRACT

A plenum separator system for separating the hot plenum from the cold plenum and from the reactor vessel wall in a pool-type nuclear reactor. One or more intermediate plena containing substantially stagnant and thermally stratified coolant provide axial separation of the hot and cold plena. A dual pass forced bypass flow through annuli at the upper portion of the reactor vessel wall, in conjunction with the intermediate plenum and an annular gas space adjacent the reactor vessel wall, provide radial separation of the hot plenum and the vessel wall.

2 Claims, 3 Drawing Figures

PLENUM SEPARATOR SYSTEM FOR POOL-TYPE NUCLEAR REACTORS

This application is a continuation of application Ser. No. 192,145, filed Sept. 29, 1980 (now abandoned) which is a continuation of application Ser. No. 938,628 filed Aug. 31, 1978, now abandoned.

BACKGROUND OF THE INVENTION

1. Field of the Invention

This invention relates to pool-type nuclear reactors and more particularly provides an arrangement for substantially separating the hot and cold coolant plena in a pool-type liquid metal cooled fast breeder reactor.

2. Description of the Prior Art

In a pool-type nuclear reactor a large reactor vessel contains the major components, such as the reactor core, coolant pumps and main heat exchangers, within a pool of liquid coolant such as sodium. Generally, the coolant is pumped from a cold plenum into and through the core, and discharged into a hot plenum. From the hot plenum the coolant flows through the heat exchangers, transferring heat energy to another coolant, typically for the ultimate purpose of electric power generation, and is discharged back to the cold plenum.

A major component of such reactors has been a structure, known alternatively as a plenum separator, reactor jacket, inner tank, primary tank, insulated internal tank or internal thermal liner, which separates the hot coolant in the hot plenum from the reactor vessel wall so as to alleviate thermal transients and stresses. This component also serves to somewhat separate the hot and cold plena in some configurations. In typical existing pool reactor designs the plenum separator is a cylindrical shell which is arranged to place low temperature sodium coolant in an annular region in contact with the reactor vessel wall. In most arrangements, the free or upper surface of this cold coolant changes in elevation during reactor operation, and particularly at start-up and shutdown, by up to eight feet as a result of the pressure differentials between the plenums necessary to circulate the coolant through the primary heat exchangers. Such cycling is undesirable as it results in substantial thermal transients on the vessel wall and the plenum separator. An arrangement which alleviates the elevation change is that of the Soviet BN-600 plant which pumps coolant from the cold pool upwardly through an annulus adjacent the vessel wall and into the top of the hot plenum. While this arrangement alleviates the elevational fluctuations, it requires a forced pumping and the coolant passing through the annulus is not available for core cooling, presenting an overall loss of efficiency. Additional thermal stress concerns are also raised in the BN-600 and other pool reactor arrangements as the lower support structure, which typically supports the weight of the core components, is directly exposed on its top surface to the hot coolant and on its bottom surface to the cold coolant. This temperature differential can range up to approximately 300+ F. Such arrangements also typically require large amounts of under-sodium insulation in the region of the plenum separator, the long-term operational characteristics of which are not totally certain.

Accordingly, it is desirable to provide a plenum separator arrangement which alleviates the above and other thermal transient and stress concerns while providing acceptable reactor system efficiency.

SUMMARY OF THE INVENTION

This invention provides a plenum separator system for pool-type nuclear reactors which substantially lessens undesirable thermal effects on major components. A primary feature of the invention is the addition of one or more intermediate plena, containing substantially stagnant and stratified coolant, which separate the hot and cold plena and particularly the hot plena from critical reactor components. This plenum separator system also includes a plurality of components which together form a dual pass flow path annular region spaced from the reactor vessel wall by an annular gas space. The bypass flow through the flow path is relatively small and is drawn from the main coolant pumps and discharged to an intermediate plenum.

The intermediate plenum, which for purposes of description is hereinafter referred to as an inner intermediate plenum and an outer intermediate plenum, segregates the hot coolant, such as liquid sodium, from the cold sodium coolant, in both axial and radial directions. The inner intermediate plenum is an annulus which surrounds the core, which core is radially contained within a cylindrical core barrel. The plenum extends radially between the core barrel and the lower portion of a cylindrical neutron shield, the primary function of which is to alleviate activation of the secondary coolant flowing through the primary heat exchangers. The inner intermediate plenum extends axially substantially the height of the core barrel, bounded on the bottom by the lower support structure and on the top by an inner horizontal baffle which is an annular plate spanning the distance between the core barrel and the neutron shield. Below and radially about a portion of the lower support structure is the cold plenum, and above the inner horizontal baffle is the hot plenum. The inner intermediate plenum will rise in temperature during reactor start-up and achieve a substantially stagnant and stratified thermal profile at normal operation conditions. A relatively small amount of coolant will be discharged from the inner intermediate plenum through the area of attachment of the simply supported inner horizontal baffle, as a result of thermal expansion of the coolant during start-up. A reverse effect occurs during reactor cool-down. Otherwise, the inner intermediate plenum is substantially quiescent.

The outer intermediate plenum is also an annular region which contains vertical passages for containing the primary heat exchangers and cylindrical standpipes about the primary pumps. It extends radially generally between the upper portion of the neutron shield and a bypass flow annulus adjacent the reactor vessel wall. It extends axially between a plate of the lower support structure and an outer horizontal baffle. Below the lower support structure is the cold plenum from which the primary pump suction draws coolant, and above the outer horizontal baffle is the hot sodium plenum. The relatively small rate of bypass flow is discharged into the outer intermediate plenum, and a corresponding flow is discharged as leakage passed the juncture of the primary heat exchangers with the bottom plate of the lower support structure and small flow areas about the outer horizontal baffle. The bypass flow need be of relatively small magnitude as a result of an annular gas space adjacent the upper portion of the reactor vessel wall. During normal operation the outer intermediate plenum also remains substantially stagnant and stratified.

The bypass fluid for cooling the central portion of the reactor vessel wall, above the cold plenum, is drawn from the pumps into a distribution channel and discharged upwardly between the reactor vessel wall and a flow baffle defining the outer periphery of the outer intermediate plenum. The flow baffle is a bottom supported, substantially cylindrical shell with a conical transition between a lower and an upper segment. The flow baffle is accordingly free to expand upwardly with changes in its thermal profile. Also bottom supported is a plenum separator plate comprising two concentric cylindrical shells joined at their tops by a transition which is spaced above and straddles the top of the flow baffle. The outer shell is a structural support for the inner shell and also functions as a shield for the upper portion of the reactor vessle wall. The inner shell is a thinner membrane which is insulated preferably on the face closest to the reactor vessel. The bypass sodium accordingly passes upwardly between the reactor vessel wall and the flow baffle, and then enters the annulus formed between the upper segment of the flow baffle and the outer shell of the plenum separator plate. It continues to flow upwardly and over the top of the flow baffle, reversing direction and flowing downwardly in an annulus between the inner side of the flow baffle and the insulation on the plenum separator plate inner shell. This coolant is then discharged into the outer intermediate plenum, containing the primary heat exchangers, so that heat absorbed by the bypass flow is transferred through the shells of, and into, the heat exchangers.

It is thus apparent that the vessel wall is maintained acceptably cool since its lower portion is adjacent the cold plenum, its central portion is adjacent the bypass flow which is adjacent the outer intermediate plenum, and its upper portion is adjacent an annular gas space in direct communication with the cover gas above the level of the coolant in the hot plenum. The gas space is, however, insulated from the hot plenum liquid coolant by the dual bypass flow, and the large thermal ingredient from the hot plenum is taken across the insulation plates affixed to the plenum support plate inner shell. This structure also functions as a coolant aerosol condenser to control the condensation of coolant vapor and maintain the annular gas space substantially free of liquid.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1A:
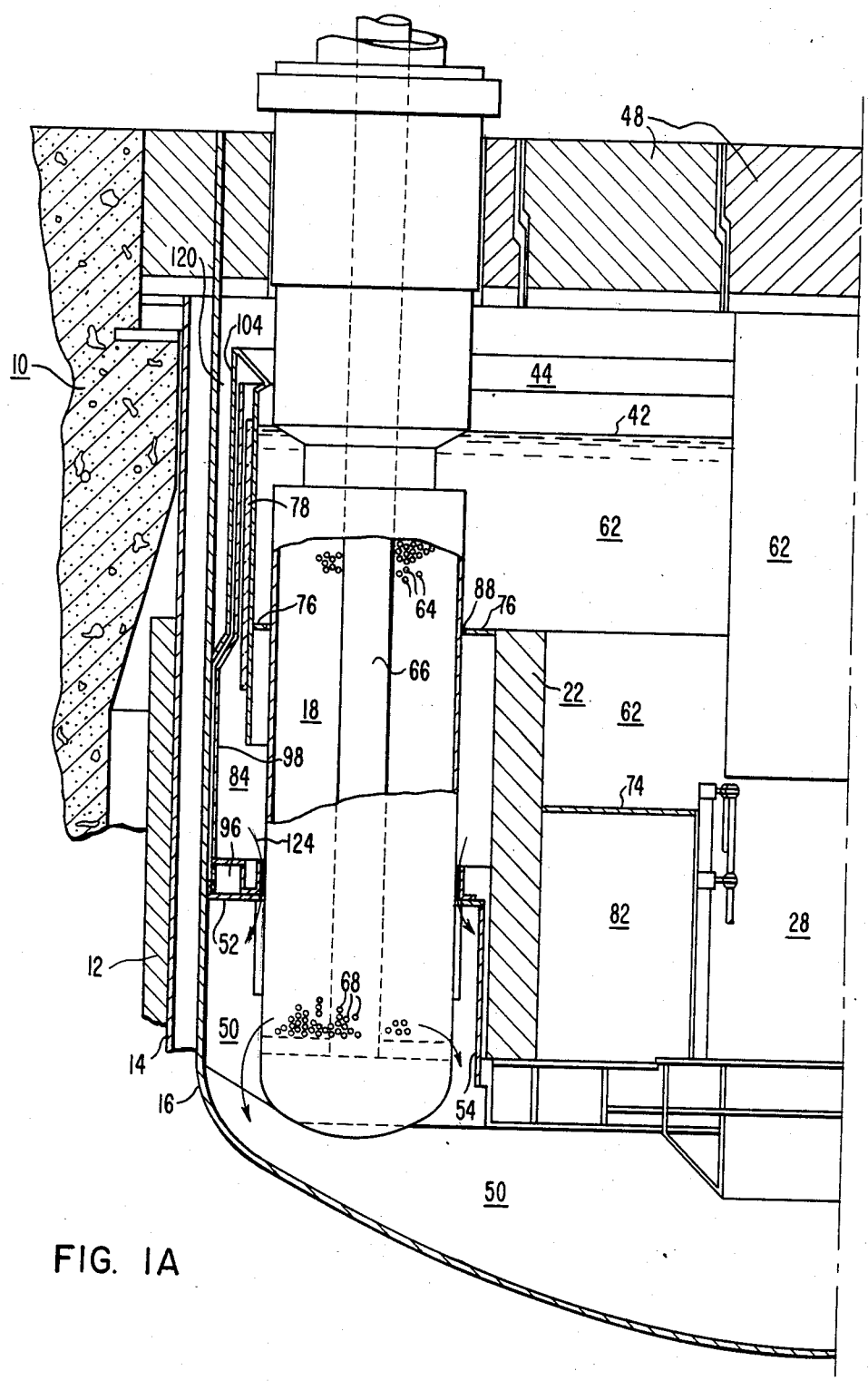
FIGS. 1A and 1B together are an elevational cross section of a pool-type nuclear reactor in accordance with the invention.
Figure 1B:
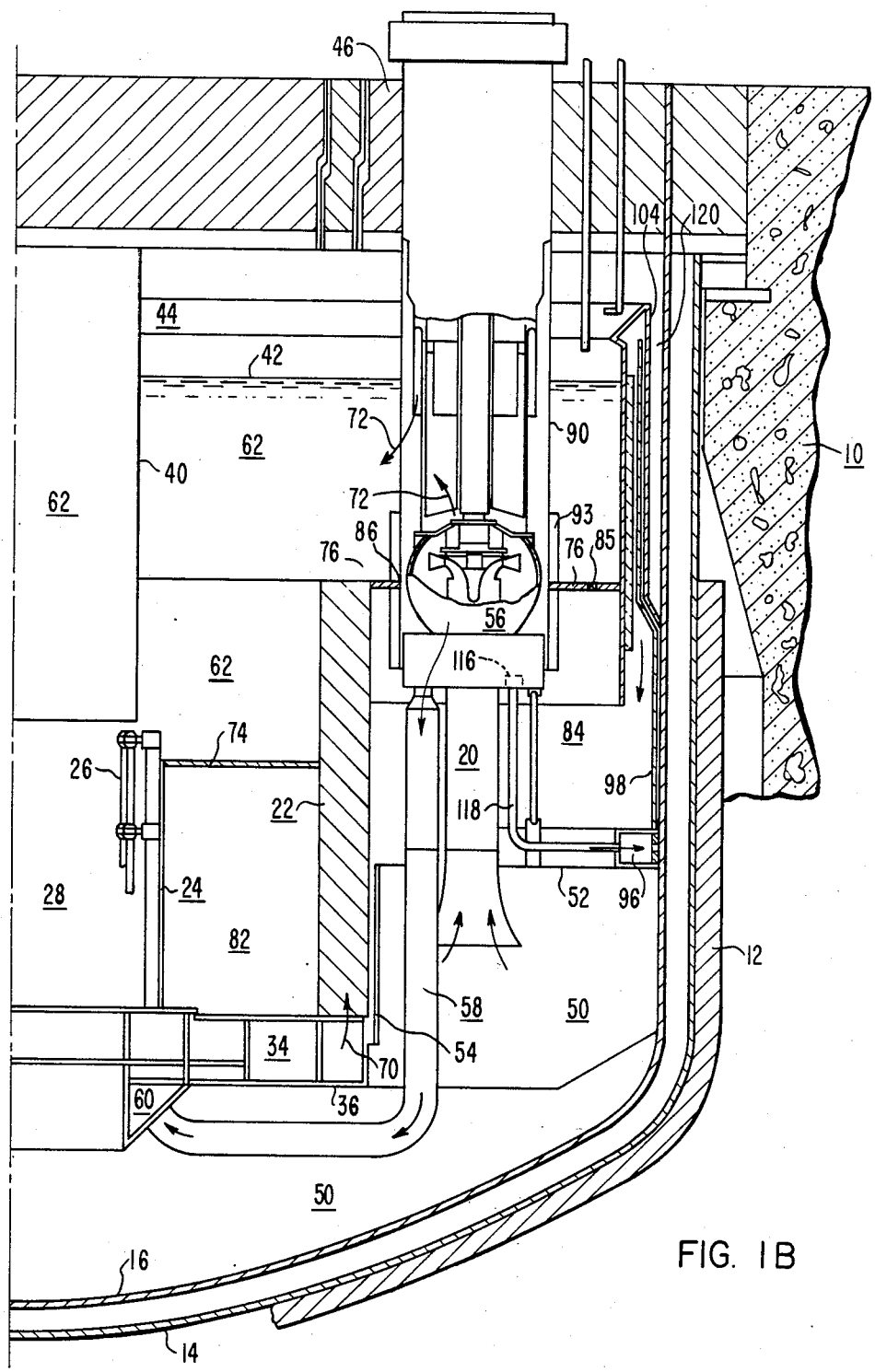

Referring now to the Figures, there is shown a portion of a pool-type nuclear reactor plant utilizing a liquid coolant, such as a liquid metal, for example, sodium, incorporating a plenum separator system. It is to be understood that the reactor shown is substantially cylindrical and that the view shown in FIGS. 1A and 1B represents a cross section along two radii. The components shown include, radially from exterior to interior, a concrete shield and support 10, vessel thermal insulation 12, a guard tank 14, a reactor vessel 16, a primary heat exchanger 18 and coolant pump 20, a neutron shield 22, a core barrel 24, and fuel assemblies 26 making up a core 28. Typically there are a plurality of primary pumps 20 and heat exchangers 18, such as four pumps 20 and six heat exchangers 18, although only one of each is shown. The core 28 includes a region of both fertile and fissile fuel surrounded by an additional region of fertile fuel, and is contained radially by the core barrel 24. The core 28 is supported upon a lower support structure 34 which includes a core support structure 36, an extension plate 54, and a bottom plate 52.

Above the core is an upper internals structure, shown merely by the envelope 40, which includes a plurality of components for aiding communication between the exterior of the reactor and the core 28 and for guiding such components as reciprocatingly insertable control rods. The typical level of sodium coolant during normal operation is shown by the line 42. Above the level 42 is a cover gas space 44, typically containing an inert gas such as argon, and above the cover gas is a plurality of rotatable plugs 48 supported by a reactor roof structure 46.

The primary pump 20 draws suction from a cold pool or plenum 50 of sodium, which is bounded by the bottom portion of the reactor vessel 16, the bottom plate 52, extension plate 54, and the core support structure 36. The main coolant flow path is from the cold plenum 50 upwardly to the pump impeller section 56, and downwardly into and through conduit 58. The coolant discharged from the plurality of conduits 58 (one shown) mixes in an annular region 60 within the core support structure 36, and passes upwardly through the core 28, absorbing heat energy. The coolant enters the core at a temperature in the range of 670° F. and is discharged at a temperature in the range of 950° F. The flow through the core is on the order of one hundred million pounds of sodium per hour at an average velocity of approximately twenty-five feet per second. It therefore exits into the hot sodium pool or plenum 62, discussed hereinafter, with a great deal of turbulence. From the hot plenum 62, the sodium enters the primary heat exchangers 18 (one shown) through a plurality of inlets 64 and flows downwardly, transferring heat to a secondary coolant, such as sodium, flowing, for example, in a downcomer 66, to the bottom of the heat exchanger 18, and then upwardly through the shell side of the heat exchanger. The primary sodium coolant then exits the heat exchangers 18 through outlets 68, returning to the cold plenum 50, thus completing the main circuit. Additional and considerably smaller flow rate flow paths include coolant distributed through the core support structure 36 to and through the neutron shield 22 (shown by arrow 70), pump seal leakage flow distributed to the hot plenum 62 (shown by arrow 72), and controlled bypass flow for cooling the reactor vessel discussed in detail hereinafter. The flow through the neutron shield is approximately 100,000 pounds per hour, and pump seal leakage represents approximately 10,000 pounds per hour from all four pumps 20.

In accordance with the invention the hot plenum 62 is a turbulent flow area, bounded below by the core fuel assemblies 26, an inner horizontal baffle 74, and an outer horizontal baffle 76. It is bounded radially at its lower portion by the neutron shield 22, and at its upper portion by an inner shell 78 of a plenum separator plate 80.

The top of the hot plenum is bounded by the cover gas space 44.

The plenum separator system separates the hot plenum 62 from the cold plenum 50 and also from the reactor vessel wall. It includes the plenum separator plate 80 and an inner intermediate plenum 82 and an outer intermediate plenum 84. The inner intermediate plenum is bounded axially by the core support structure 36 and the inner horizontal baffle 74, and is bounded radially by the core barrel 24 and the neutron shield 22.

The inner horizontal baffle 74 is an annular plate which is preferably affixed along its outer periphery and simply supported at the core barrel along its inner periphery. By defining the annular shaped inner intermediate plenum 82, the baffle 74 restricts the turbulent currents of the hot plenum so that thermal stratification of the sodium below the baffle 74 develops, preventing the 950° F. hot sodium from contacting the 670° F. core support structure 36. There is substantially no pressure differential across the inner horizontal baffle 74 so that the inner intermediate plenum is substantially quiescent except during reactor start-up or shutdown when, due to thermal expansion or contraction of the sodium within the plenum 82, a corresponding amount of sodium leaves or enters the plenum through small flow paths at the inner periphery of the inner horizontal baffle 74.

The outer horizontal baffle 76 is also an annular plate, preferably simply supported at at least one periphery. Pressure vents 85 are preferably incorporated in the baffle 76, and can also be incorporated in the inner horizontal baffle 74, to assure that pressure is equalized on each side of the baffle, thus reducing leakage flows and mechanical loading. The baffle 76 contains cylindrical apertures 86 and 88 which respectively surround primary pump standpipes 90 and the primary heat exchangers 18. There is preferably no flow passed these junctures into the outer intermediate plenum and expandable seals such as metallic bellows can be utilized to seal about the apertures. Together, the outer 84 and inner 82 intermediate plenum axially separate the hot 62 and cold 50 plena. Insulation 93 is preferably provided about the pump standpipes 90, above and below the outer horizontal baffle 76 to protect the high pressure chamber of the pump. The outer horizontal baffle 76 should be positioned as high as possible within the reactor system so as to increase the volume of the outer intermediate plenum 84 and decrease the volume of the hot plenum 62. This orientation provides a more efficient reactor and heat transfer since the hot plenum becomes more turbulent for a given sodium flow rate and provides a more direct flow path between the core 28 and the primary heat exchangers 18.

Figure 2:
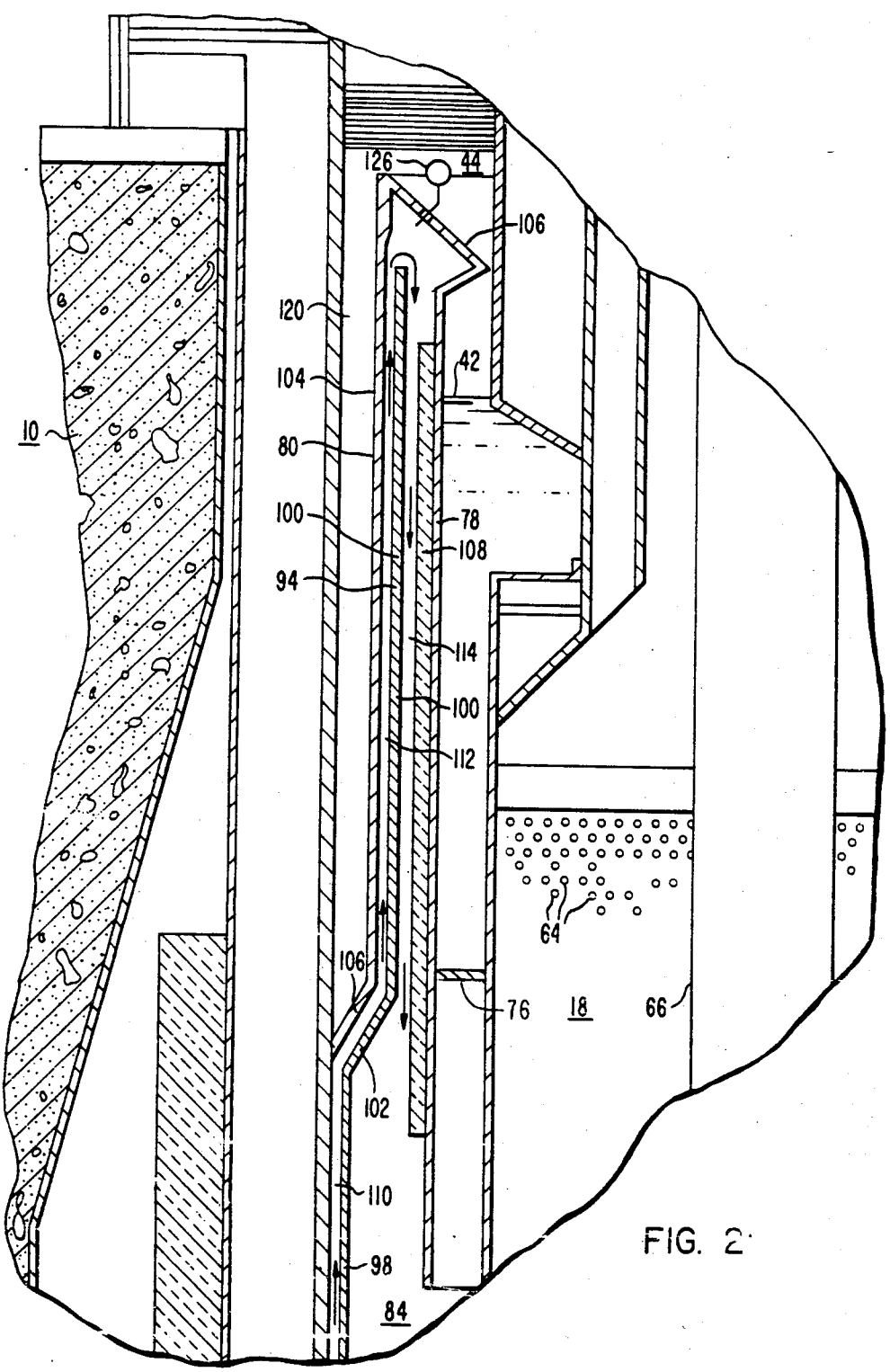
FIG. 2 is an enlarged view of a portion of the reactor of FIGS. 1A and 1B.

The plenum separator system also includes a vertically oriented flow baffle 94 (FIG. 2) which is bottom supported and thus free to expand axially. It is preferably affixed to the bottom plate 52 or the top plate of a bypass flow distribution channel 96. The flow baffle 94 includes a lower segment 98 and upper segment 100, both of which are cylindrical and concentrically spaced from the reactor vessel wall. The segments 98, 100 are joined by a conical transition plate 102. A sodium shield 104, comprising the outer portion of the plenum separator plate 80, parallels the transition and the upper segment 100 of the baffle 94. The separator plate 80 is also bottom supported and includes a transition 106 between the sodium shield 104 and the inner shell 78, the transition 106 extending above the flow baffle 94. Thermal insulation 108, such as Technigaz, commercially available from Glitsch Cryogenics, is preferably affixed to the outer side of the inner shell 78. Such insulation can also be affixed to the inner side of the shell 78. It can be seen that the large radial thermal gradient from the hot plenum is taken across the insulation. This configuration forms a series of annuli including an annulus 110 between the flow baffle lower segment 98 and the reactor vessel wall, an annulus 112 between the flow baffle upper segment 100 and the sodium shield 104, and an annulus 114 between the flow baffle upper segment 100 and the separator inner shell 78 and insulation 108.

During normal reactor operation bypass flow is discharged from each of the primary pumps 20, controlled by a flow control orifice 116, through conduit 118 to the annular bypass flow distribution channel 96. It then flows upwardly through annulus 110 and annulus 112, is reversed in direction, and flows downwardly through annulus 114 to be discharged into the outer intermediate plenum 84.

The transition 102 configuration lowers the velocity of the bypass flow as it merges with coolant in the outer intermediate plenum 84, thereby not substantially disrupting the desirable coolant stratification. The transition configuration also adds stiffness to the flow baffle 94 and plenum support plate 80 which are large diameter, thin walled shells. The overall bypass configuration also increases the flow velocity near the reactor vessel wall, assuring sufficient vessel wall cooling. The configuration additionally defines a gas space annulus 120 in communication with the cover gas space 44, which, in conjunction with the bypass flow and insulation, thermally shields the upper portion of the vessel wall and facilitates utilization of a so-called "cold roof" structure. Condensation of sodium vapor within the gas space annulus 120 is alleviated by the top section of the transition 106 acting as an aerosol condenser which chills sodium aerosol from the hot plenum 62, cools it by heat exchange with the bypass flow, and allows the sodium to drip back into the hot plenum 62. It can be seen therefore that the plenum separator system also segregates the hot plenum 62 from the reactor vessel 16 wall in a radial direction.

Although the bypass cooling represents a small portion of the total reactor coolant flow, approximately one percent, it will be noted that the loss of heat from the cold plenum 62 to the bypass flow is to a large degree recovered by transfer from the outer intermediate plenum 84 through the primary heat exchanger shell into the coolant flowing through the heat exchanger 18. The coolant within the outer intermediate plenum 84 remains substantially thermally stratified and quiescent as a quantity of coolant corresponding to that entering the plenum 84 is continuously discharged as leakage across the intermediate plenum 84-cold plenum 50 boundary, shown by the arrow 124, and as a small discharge about the outer horizontal baffle 76. The major portion of this discharge will be as leakage 124, since the pressure differential across the outer horizontal baffle 76 is negligible during most operating conditions while the pressure differential into the cold plenum is approximately three psi, and taken across the lower support structure. It will be noted that is there is an excess of leakage flow as compared to the bypass flow, sodium will move from the hot pool into the intermediate pool at the interface of the horizontal baffle and the primary heat exchangers. It will also be noted that these displacements of sodium into the outer intermediate plenum 84 are at locations where the receiving plenum sodium temperature is substantially equal to the temperature of the displaced sodium, and that the velocities are small, thus minimizing thermal differential concerns.

A pressure relief valve 126 or external flow path can also be utilized at the top of the plenum separator plate 80 to vent any gas which is trapped in the upper portion of the annulus such as during initial fill of the system. However, once the annular bypass flow paths are filled with sodium, the paths should remain as a solid flow system. It will therefore be noted that even when the primary pumps 20 are completely shut down, a siphon flow will exist in the annular flow paths, but the direction of flow may reverse. The sodium will receive heat from the hot plenum and rise within the annulus 114. The sodium in annulus 112 will reject heat to the vessel and flow downwardly. However, under pony motor flow the coolant bypass flow path is solid and flow will continue to circulate in its normal direction to maintain the reactor vessel wall at acceptably cool temperatures.

It will now be apparent to those skilled in the art that the disclosed plenum separator system arrangement provides substantial operational and fabrication advantages for pool-type nuclear reactors as compared to the prior art. The system provides good reactor vessel wall cooling, allowing utilization of a cold roof structure. It alleviates thermal cycling and stresses imposed upon components which in the prior art have directly separated the hot and cold plena, and provides both axial and radial separation of the hot plenum from the reactor vessel as well as from the cold plenum. Thermal transients due to sodium surface elevation variation are eliminated.

The components utilized are relatively simple to fabricate, install and analyze, utilizing basic geometric shapes. The components are arranged and supported to easily accommodate differential thermal expansion, such as the bottom supported components adjacent the reactor vessel wall. These factors result in a high reliability design which should require little maintenance throughout the operating life of the reactor plant.

Additionally, the effect upon reactor efficiency as a result of the bypass coolant flow is slight since the volumetric flow rate required is low and a substantial portion of the heat transferred is recovered by the primary heat exchangers. Reactor efficiency is further enhanced since the utilization and orientation of an intermediate plenum allows a substantial reduction in the volume of the hot plenum.

Further, the pressure differential between the hot and cold plena is more distributed than in previous arrangements, to a large degree being taken over the intermediate plenum as well as the lower support structure. Where the pressure differentials do result in flow across components, the temperatures are close and the flow rates small, alleviating detrimental stresses. The overall configuration also alleviates the need for exotic materials and methods of construction.

It will be apparent that many modifications and additions are possible without departing from the scope of the teaching.

I claim:

1. A pool-type liquid-metal-heat-transfer nuclear reactor comprising:

a vertically disposed generally cylindrical reactor vessel having a closed bottom portion, and a closure head atop said reactor vessel and closing said reactor vessel;

said reactor vessel enclosing the major components of said nuclear reactor which include a reactor core supported at a centrally disposed lower portion of said reactor vessel, a core barrel radially bounding fuel assemblies and comprising said reactor core, liquid metal pumps having intakes and also having outlets which connect to conduits which feed liquid metal into the bottom of said reactor core to pump liquid metal upwardly therethrough to heat said liquid metal, heat exchangers having heated liquid-metal intakes and cooled liquid-metal discharges and operable to transfer heat from said core-heated liquid metal to another heat-transfer medium for the transfer of generated heat from said reactor, a space immediately underneath said closure head which comprises a cover gas space and encloses inert gas, and said reactor-vessel-enclosed major reactor components immersed in said heat-transfer liquid metal;

a bottom-supported gas-plenum-forming hollow cylindrical member closed at its upper end, said hollow cylindrical member sealed to and supported by said reactor vessel and extending upwardly and in inwardly spaced relationship with respect to said reactor vessel and into but not through said gas cover space to form with said reactor vessel an elongated annular-conformed gas plenum in gaseous communication with said gas cover space, and means for removing heat from said annular gas plenum and for cooling the upper portion of said cylindrical member to condense liquid-metal vapor from the atmosphere thereabout to substantially prevent liquid-metal condensation in said annular gas plenum;

a hollow cylindrically conformed neutron shield member spaced from and radially surrounding said reactor core;

separate liquid-metal plena confining liquid metal during normal reactor operation and comprising a hot upper plenum, a cold lower plenum and intermediate temperature plena; said intermediate temperature plena being positioned so as to separate said hot upper plenum from said cold lower plenum; upper structural members extending from the top portion of said reactor core barrel to said neutron shield member and from said neutron shield member to said gas-plenum-forming cylindrical member and together with said gas cover space defining the boundaries of said hot upper plenum; lower structural members extending from the bottom portion of said reactor core barrel to said reactor vessel and together with said reactor vessel and said closed bottom portion thereof defining the boundaries of said cold lower plenum; and the boundaries of said intermediate temperature plena are defined by said reactor core barrel, said upper structural members, portions of said neutron shield and said lower structural members, and one of said intermediate temperature plena formed in part by the lower portion of said gas-plenum-forming cylindrical member;

the liquid metal intakes of said liquid metal pumps positioned in said cold lower plenum with the cooler liquid metal therein being pumped upwardly through said reactor core to be heated and exit therefrom in a turbulent fashion;

the liquid metal intakes of said heat exchangers positioned within said hot upper plenum and the liquid metal discharges of said heat exchangers positioned within said cold lower plenum to discharge cooled liquid metal into said cold lower plenum; and the liquid metal contained in said intermediate temperature plena being substantially stagnant and thermally stratified to grade the temperature differential between the liquid metal in said hot upper plenum and the liquid metal in said cold lower plenum; whereby the temperature differential conditions existing between said hot upper plenum and said cold lower plenum are graded by said intermediate temperature plena and hot liquid metal in said hot upper plenum is insulated from said reactor vessel by said annular gas plenum; said bottom-supported hollow cylindrical member having inner and outer walls defining an annular space therebetween, a cylindrical flow baffle extending between said inner and outer walls of said bottom-supported hollow cylindrical member, said cylindrical flow baffle being spaced from said inner wall and said outer wall and extending substantially the height of said bottomsupported hollow cylindrical member, and during normal reaction operation a relatively small volume of said liquid metal is pumped by said liquid metal pumps from said cold lower plenum and upwardly through the space between said outer wall and said cylindrical flow baffle and then downwardly through the space between said inner wall and said cylindrical flow baffle and thence to return to said intermediate-temperature plenum to cool said elongated annular gas plenum and the top portion of said hollow cylindrical member.

2. The nuclear reactor as specified in claim 1, wherein said liquid metal is sodium, said core is supported by said lower structural members which comprise a part of said cold lower plenum, and said liquid metal pumps and said heat exchangers are supported from said closure head.

* * * * *